(12) United States Patent (10) Patent No.: US 9,082,243 B2
Gostoli et al. (45) Date of Patent: Jul. 14, 2015

(54) FUEL SAVING-AIMED MOTOR VEHICLE DRIVING STYLE EVALUATION

(71) Applicants: C.R.F. Societa' Consortile per Azioni, Orbassano (IT); IVECO S.p.A., Turin (IT)

(72) Inventors: Domenico Gostoli, Turin (IT); Stefano Salio, Turin (IT); Claudio Ricci, Orbassano (IT); Silvio Data, Orbassano (IT); Maurizio Miglietta, Orbassano (IT); Mario Gambera, Orbassano (IT); Andrea Secondi, Orbassano (IT)

(73) Assignees: C.R.F. Societa' Consortile per Azioni, Orbassano (IT); IVECO S.p.A., Torino (IT)

( * ) Notice: Subject to any disclaimer, the term of this patent is extended or adjusted under 35 U.S.C. 154(b) by 0 days.

(21) Appl. No.: 14/126,190

(22) PCT Filed: Nov. 16, 2012

(86) PCT No.: PCT/IB2012/056505
§ 371 (c)(1),
(2) Date: Dec. 13, 2013

(87) PCT Pub. No.: WO2013/072895
PCT Pub. Date: May 23, 2013

(65) Prior Publication Data
US 2014/0188379 A1 Jul. 3, 2014

(30) Foreign Application Priority Data
Nov. 16, 2011 (EP) .................................... 11425280

(51) Int. Cl.
*G06F 19/00* (2011.01)
*G07C 5/00* (2006.01)
*B60W 40/09* (2012.01)
*B60W 50/00* (2006.01)
*G07C 5/08* (2006.01)

(52) U.S. Cl.
CPC ............... *G07C 5/008* (2013.01); *B60W 40/09* (2013.01); *B60W 50/0098* (2013.01); *G07C 5/085* (2013.01); *B60W 2050/0045* (2013.01); *B60W 2050/0089* (2013.01)

(58) Field of Classification Search
CPC ......... G07C 5/008; C08L 53/00; C08L 15/00; G01F 9/023; G01F 9/001; B60R 16/0236; G05D 1/0005; G06G 7/70
USPC ............................... 701/1, 123; 340/438, 439
See application file for complete search history.

(56) References Cited

U.S. PATENT DOCUMENTS

| | | | |
|---|---|---|---|
| 5,566,072 A * | 10/1996 | Momose et al. | 701/117 |
| 6,745,151 B2 * | 6/2004 | Marko et al. | 702/182 |
| 8,682,572 B2 * | 3/2014 | Raz et al. | 701/123 |
| 2002/0128751 A1 * | 9/2002 | Engstrom et al. | 701/1 |
| 2003/0216889 A1 * | 11/2003 | Marko et al. | 702/182 |
| 2005/0288850 A1 * | 12/2005 | Sato | 701/123 |
| 2008/0314658 A1 * | 12/2008 | Atarashi et al. | 180/65.2 |
| 2009/0150314 A1 * | 6/2009 | Engstrom et al. | 706/21 |
| 2009/0299707 A1 * | 12/2009 | Putkonen | 703/2 |
| 2010/0030458 A1 * | 2/2010 | Coughlin | 701/123 |
| 2010/0209889 A1 * | 8/2010 | Huang et al. | 434/65 |
| 2011/0166773 A1 * | 7/2011 | Raz et al. | 701/123 |
| 2012/0078496 A1 * | 3/2012 | Lindhuber et al. | 701/123 |

FOREIGN PATENT DOCUMENTS

| | | |
|---|---|---|
| DE | 44 28 311 A1 | 2/1995 |
| EP | 2 320 387 A1 | 5/2011 |
| GB | 2 388 666 A | 11/2003 |

* cited by examiner

*Primary Examiner* — Helal A Algahaim
*Assistant Examiner* — Shardul Patel
(74) *Attorney, Agent, or Firm* — Dickstein Shapiro LLP

(57) ABSTRACT

A driving style evaluation system (1) for a motor vehicle (2), configured to receive and process motor vehicle-related data and motor vehicle mission-related data to compute a Driving Style Evaluation Index (DSEI) indicative of the driving style of a motor vehicle driver during a motor vehicle mission in relation to a motor vehicle fuel consumption, based on the following summary index: Fuel Economy Index (FEI), which is indicative of the driving style of the motor vehicle driver from the fuel saving perspective, and is computed based on pre-summary indices computed based on respective partial indices in turn computed based on a combination of the following physical quantities which affect the motor vehicle fuel consumption: time interval, ending with a motor vehicle stop, during which the motor vehicle speed reduction is mainly due to a combination of a gas pedal release and a gear downshift, possibly with operation of at least one motor vehicle braking system only during the final part of the maneuver; engine speed and torque fluctuations within preset time intervals; time elapsed between a gas pedal release and operation of at least one motor vehicle braking system; time during which at least one motor vehicle braking system is operated; amount of energy dissipated by at least one motor vehicle braking system; engine power and instantaneous fuel consumption in different gears; and time interval between two consecutive gear shifts; and wherein the pre-summary and partial indices are weighted by means of respective dynamic weighting coefficients, each of which is computed based on a respective motor vehicle mission-independent weight, which is indicative of the influence that the physical quantities based on the which the Fuel Economy Index (FEI) is computed have on the overall fuel consumption reduction, and based on a respective motor vehicle mission-dependent benefit, which represents an evaluation of the benefit that the Fuel Economy Index (FEI) provides in the driving style evaluation during the motor vehicle mission.

13 Claims, 7 Drawing Sheets

FUEL SAVING-AIMED MOTOR VEHICLE DRIVING STYLE EVALUATION

TECHNICAL FIELD OF INVENTION

The present invention relates to a motor vehicle driving style evaluation, in particular for a road vehicle used for transporting people, such as a passenger car, a bus, a camper, etc., or goods, such as an industrial vehicle (lorry, articulated lorry, articulated vehicle, etc.) or a light or medium weight commercial vehicle (van, van with covered body, cab truck, etc.), aimed in general at an energy-efficient use of fuel and, in particular, at fuel saving.

STATE OF THE ART

Increasing public awareness of climatic change, and introduction of legislation on $CO_2$ emissions of passenger cars and commercial vehicles in many countries, are driving original equipment manufacturers (OEM) and suppliers to improve vehicle efficiency through sophisticated and expensive systems and components.

Unfortunately, even the most efficient vehicle will produce large quantities of $CO_2$ if it used by "aggressive drivers" and/or in unfavourable traffic conditions. As such, measures or technologies that evaluate driver behaviour and inform the driver on the most efficient route are able to deliver considerable improvements in fuel consumption and $CO_2$ emission reduction.

This means that improved navigation systems (eco-navigation) are to be expected, systems enabling motor vehicles to communicate with other vehicles and/or dedicated infrastructures, and systems suggesting the most effective way of driving (eco-driving) to all play a significant role in the future of emission reduction, due to the favourable cost-benefit ratio associated therewith.

In 2008, a system for evaluating the driving behaviour of the driver of a road vehicle was put on the market, with the name eco:Drive™, with the aim of reducing fuel consumption and $CO_2$ emissions; this is an onboard driver behaviour analysis technology developed to facilitate environmentally aware driver behaviour. eco:Drive™ allows customers to collect telemetric driving data from their on-vehicle computers via a dashboard USB port. This data is then analysed by a personal computer software application that uses algorithms developed to provide personalized feedbacks on how to change driving style to achieve maximum fuel efficiency from the motor vehicle. By following the eco:Drive™ advice, the customer is able to quantify the improvements on fuel consumption and $CO_2$ emissions that arise from a change of driving style. In particular, the eco:Drive™ software application evaluates the driver's driving behaviour, analysing four driving behaviour categories: gear usage, acceleration (accelerator pedal usage), deceleration (brake pedal usage and engine fuel cut-off mode) and speed pattern.

The driving data extracted from the on-vehicle computers is then stored on a Web server of the original equipment manufacturer who owns the eco:Drive™ system and enables the latter to perform extensive statistical analysis of journey duration, length, average vehicle speed, average engine speed and braking time and many other parameters, as well as monitoring how drivers use their motor vehicles in real life, thereby permitting internal test procedures to be verified or changes to be suggested. Real life fuel consumption and $CO_2$ emissions can be tracked for individual (anonymous) users, which allows the savings that are achieved to be identified by following the advice of the eco:Drive™ software application.

EP 2 320 387 A1 discloses a method for evaluating fuel consumption efficiency of a vehicle driven by a driver. The method comprises the steps of collecting data associated with the driver's driving performance from a plurality of sensors comprised in the vehicle, identifying a plurality of driving events based on the collected data, estimating the driver's performance in at least one driving event from among the identified plurality of driving events, wherein that at least one event if poorly performed is associated with increased fuel consumption, and based on the estimated driver's performance of the at least one driving event, evaluating a fuel consumption efficiency of the vehicle driven by the driver.

US 2005/288850 A1 discloses a driving evaluation method for evaluating a fuel consumption rate of driving a vehicle in certain driving interval on the basis of driving data acquired at time of driving in the driving interval. The method comprises calculating an energy consumption efficiency in the driving interval, calculating a driving environment variable indicative of an environment factor which exerts an influence on energy consumption by driving in the driving interval, selecting a probability density function or a cumulative distribution function corresponding to the calculated driving environment variable from a plurality of probability density functions or cumulative distribution functions having the energy consumption efficiency as a probability variable, and calculating an evaluation value for evaluating a fuel consumption rate of driving in the driving interval by using the selected probability density function or the selected cumulative distribution function and the calculated energy consumption efficiency.

SUBJECT AND SUMMARY OF THE INVENTION

The aim of the present invention is providing a motor vehicle driving style evaluation system that further improves the already widely appreciated functionality of the above-described eco:Drive™ system.

According to the present invention, a motor vehicle driving style evaluation system is provided, as defined in the appended claims.

DETAILED DESCRIPTION OF PREFERRED EMBODIMENTS OF THE INVENTION

The present invention will now be described in detail with reference to the attached figures to enable an expert in the field to embody it and use it. Various modifications to the described embodiments will be immediately obvious to experts in the field, and the generic principles described herein can be applied to other embodiments and applications without leaving the scope of protection of the present invention, as defined in the appended claims. Therefore, the present invention should not be considered as limited to the embodiments described and illustrated herein, but be conceded the broadest scope of protection consistent with the characteristics described and claimed herein.

Figure 1:
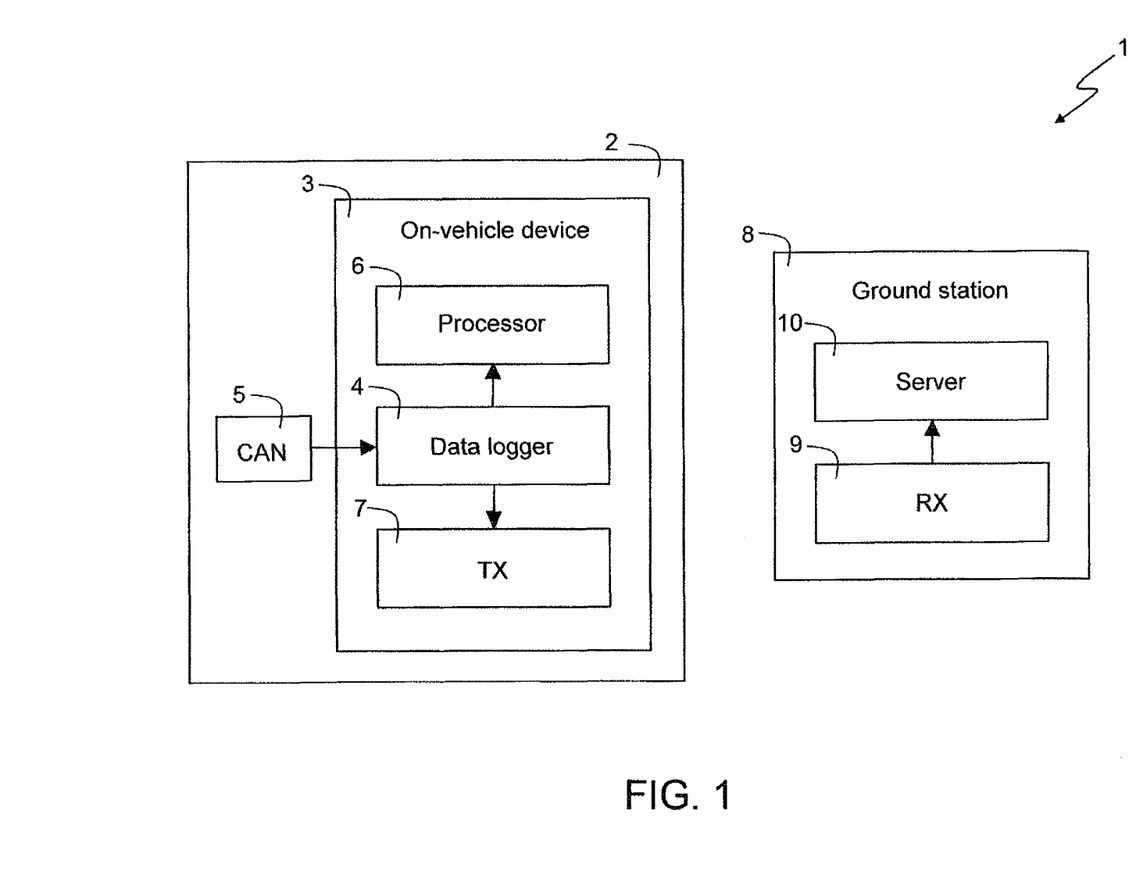
FIG. 1 shows a block diagram of a motor vehicle driving style evaluation system according to the present invention.

A motor vehicle, in particular a road vehicle, driving style evaluation system according to the present invention is shown in FIG. 1 and indicated as a whole by reference numeral 1.

The driving style evaluation system 1 basically comprises:
on-vehicle electronic equipment 3, suitable for being mounted on each of the motor vehicles 2 for which a service has been subscribed to for evaluating the driving styles of the respective drivers, to carry out an "on-board" evaluation of the driving style of the motor vehicle driver, and comprising:
a data logger 4 able to interface with the Controller Area Network (CAN) 5 of the motor vehicle 2 to download and store the mission data of the motor vehicle 2 necessary for evaluation of the driving style of the motor vehicle driver, sampling the various channels of the CAN network at an opportune sampling frequency, for example at least 1 Hz;
a data processing device 6 able to interface with the data logger 4 to acquire and process the mission data collected by the data logger 4 so as to analyse the mission of the motor vehicle 2 and evaluate the driving style of the motor vehicle driver; and
a radio transmitter device 7 able to interface with the data logger 4 to acquire the mission data collected by the latter and transmit it via radio; and
a ground station 8 designed to cooperate with the on-vehicle electronic equipment 3, for which a service has been subscribed to for evaluating the driving styles of the drivers of the respective motor vehicles, to carry out an "off-board" evaluation of the driving style of the motor vehicle driver, and comprising:
a radio receiver device 9 able to receive the mission data (time history) transmitted via radio by the radio transmitter devices 7 of the on-vehicle electronic equipment 3; and
a data processing server 10 able to interface with the radio receiver device 9 to acquire and process the mission data received by the latter in a similar manner to that performed by the data processing device 6.

In particular, the data logger 4 is configured to acquire and record the following mission data of the motor vehicle from the CAN network:
Speed
Fuel consumption
Gear engaged
Speed of front left and right-hand wheels
Activation of the basic brake, constituted by ordinary disc brakes, front and rear, controlled by the brake pedal;
Activation of auxiliary braking devices, constituted by the engine brake and the retarder;
Activation of windscreen wipers
External air temperature
Position of the accelerator pedal
Gear engaged
Engine friction torque
Engine torque
Position of the retarder lever
Activation of the cruise control
Mass of the motor vehicle
Number of satellites connected to the satellite Global Positioning System (GPS), Vertical Dilution of Points, Horizontal Dilution of Points, Latitude and Longitude.

The mission data downloaded by the data logger 4 must be formatted so that it can read by the data processing device 6 for subsequent analysis of the mission and driving style.

The data processing device 6 and the data processing server 10 are designed to store and execute driving style evaluation software, and comprise a section dedicated to the correct reading of mission data, respectively recorded in the data logger 4 and received via radio from the radio receiver device 9, and a section dedicated to its processing to analyse, for each motor vehicle, the mission of the motor vehicle and evaluate the driving style of the motor vehicle driver and, in particular, to provide the following information:
Summaries on the mission of the motor vehicle from the starting of the engine until it is subsequently stopped; and
Summaries on the mission of the motor vehicle from when the onboard computer was reset by the driver.

In addition, the driving style evaluation software executed by the data processing device 6 is further designed to also provide:
Ratings on individual events constituted by specific manoeuvres carried out by the driver of the motor vehicle: when an event is recognized from a series of contemplated events, it is processed and the performed manoeuvre is rated, providing the driver with a fuel saving-aimed rating, as is described in greater detail in the following.

Furthermore, the data processing server 10 is programmed to store the mission data collected from the on-vehicle electronic equipment 3 in an opportunely ordered manner, together with the results of the data processing carried out by the motor vehicle driving style evaluation software, so as to enable straightforward querying from a remote position.

For both the on-board application and the off-board one, the driving style evaluation software needs to receive the following engine and motor vehicle data:
Engine fuel map;
Engine friction map;
Engine idle speed and related fuel consumption;
Engine over-revving speed;
Engine, Gearbox, Driveline and Wheels Inertia;
Coast down;
Gear ratios and efficiency;
Tyre sizes;
Motor Vehicle Track.

Figure 2:
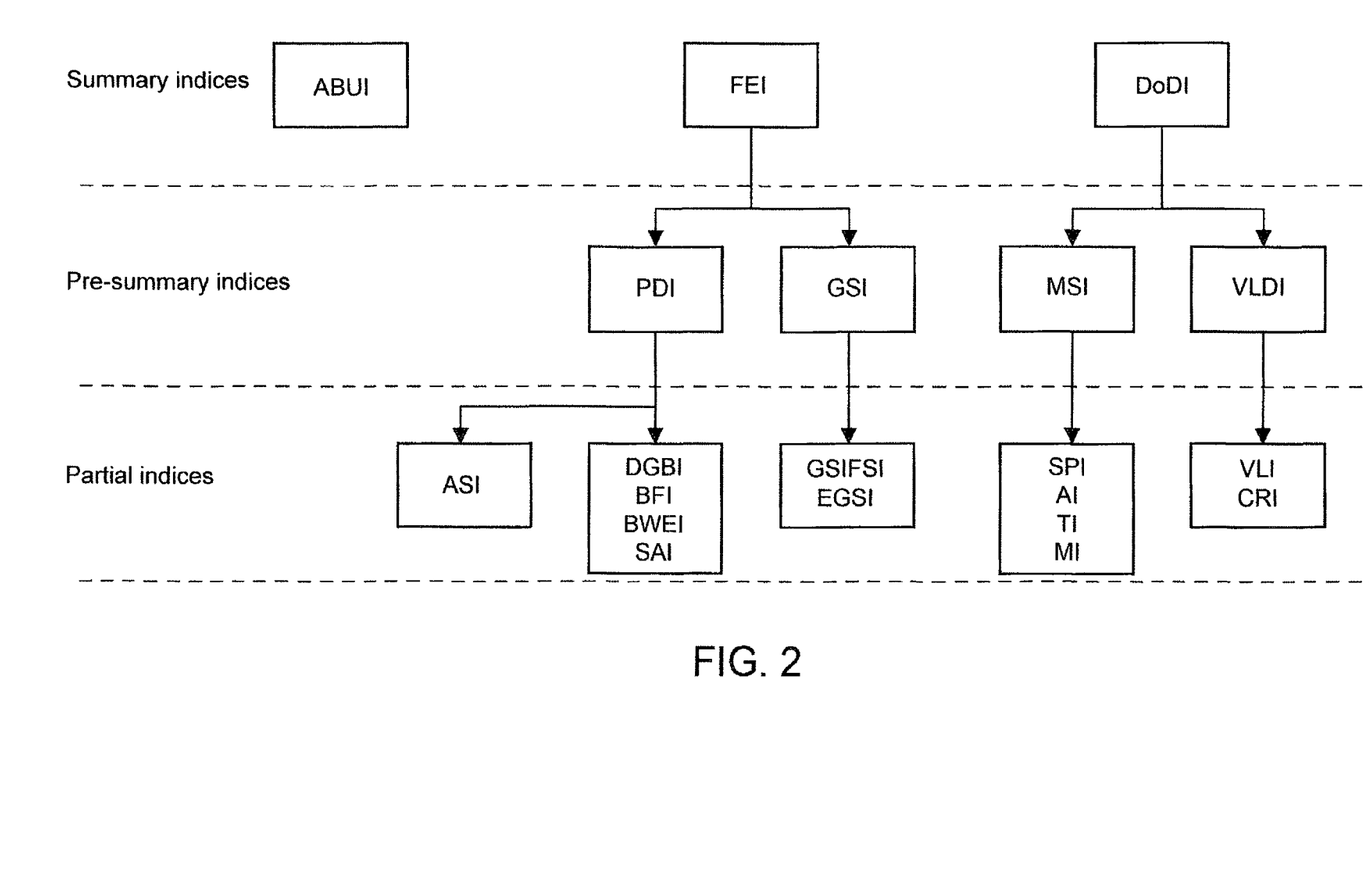
FIG. 2 shows a functional block diagram of a motor vehicle driving style evaluation software.

FIG. 2 shows a functional block diagram of the various types of processing carried out by the driving style evaluation software in relation to fuel consumption or an indicative quantity thereof, for example the motor vehicle $CO_2$ emissions.

Essentially, the driving style is evaluated by means of an index, hereinafter referred to as Driving Style Evaluation Index DSEI, which is computed based on the following summary index:

1. Fuel Economy Index FEI, which is indicative of the driving style of the motor vehicle driver from a fuel saving perspective;
and, optionally, based on one or both of the following supplementary summary indices:

2. Auxiliary Brake Usage Index ABUI, which is indicative of the usage of auxiliary braking systems, namely the engine brake and the retarder, as compared to the basic brake; and 3. Degree of Difficulty Index DoDI, which is indicative of the overall motor vehicle mission difficulty.

In particular, the Driving Style Evaluation Index DSEI is computed as a linear combination of the aforementioned three summary indices according to a relation of the type:

$$DSEI = c_0 \cdot FEI + c_1 \cdot ABUI + c_2 \cdot DoDI$$

where the three coefficients $c_0$, $c_1$ e $c_2$ represent the weights of the summary indices, are computed by means of a statistical analysis, and are indicative of the influence that the physical quantities based on which the summary indices are computed have on the overall fuel consumption reduction.

In particular, in view of the fact that driving style is evaluated from the fuel saving perspective, the Fuel Economy Index FEI is clearly the summary index that, among the aforementioned three summary indices, plays the main role, so resulting in its weight being remarkably higher than the weights of the other two summary indices in the computation of the Driving Style Evaluation Index DSEI.

Moreover, the Fuel Economy Index FEI and the Degree of Difficulty Index DoDI are each computed based on respective sub-indices, hereinafter referred to as pre-summary indices, which are in turn computed based on respective sub-indices, hereinafter referred to as partial indices, which are finally computed based on well-defined physical quantities.

In addition, the pre-summary and partial indices relating to the Fuel Economy Index FEI are weighted by means of respective dynamic weighting coefficients, each of which is computed based on a respective weight, which is indicative of the influence that the physical quantities based on which the respective index is computed have on the overall fuel consumption reduction, and also based on a respective benefit, which represents an evaluation of the benefit that the respective index provides in the driving style evaluation during the motor vehicle mission, i.e. of the positive effect that the physical quantities represented by the index have on fuel consumption reduction.

Furthermore, the pre-summary and partial indices relating to the Fuel Economy Index FEI have a different importance depending on the motor vehicle mission, so resulting in the corresponding weighting being dynamic, in the sense that while the respective weights are mission-independent and hence constant as the mission changes, and are stored in the form of a table, the corresponding benefits are instead mission-dependent and hence vary as the mission changes, and are real-time computed. In this way, the importance of each pre-summary and partial index in a given mission depends on a constant part (the weight) and on a variable part (the benefit) and their product consequently provides the variability in the weighting of the different (sub-)indices.

For example, if the motor vehicle is travelling along a stretch of motorway characterized, as is known, by long distances and normally high and constant speeds in top gear, the benefit associated with the usage of the gearbox will be very low. Supposing that the driver of the motor vehicle erroneously changes gear, locally, for example because a lane narrowing is encountered, the assigned score will be "weighed" by the benefit, low in the example considered, and therefore not excessively negative. Vice versa, in urban driving, characterized, as is known, by countless stops and starts ("Stop&Go"), incorrect usage of the gearbox will be penalized by the benefit, high in the example considered, because in this context the event is important from the viewpoint of fuel consumption reduction.

Unlike the Fuel Economy Index FEI, the pre-summary and partial indices relating to the Degree of Difficulty Index DoDI are instead weighted by means of respective static weighting coefficients, which are computed solely based on respective weights, which are constant as the motor vehicle mission changes, and therefore do not take into account the respective benefits, so resulting in the weighting of these pre-summary and partial indices not being dynamic, but static.

The above-listed indices are computed based on physical quantities measured and/or computed during the motor vehicle missions by means of a transformation process from physical quantities to indices comprising the following steps:

Carrying out very extensive test campaigns with expert and non-expert drivers in various vehicle/mission/driving style conditions, asking the expert drivers to emulate both good driving and bad driving from the fuel consumption viewpoint;

Measurement and/or computation of the physical quantities in all of the motor vehicle missions and utilization of suitable statistical techniques to identify the most significant physical quantities, which then become the selected objective physical quantities that are considered the most suitable to present the aspect under consideration;

Analysis of the variation ranges of the selected objective physical quantities as a function of the characteristics of the motor vehicle, for example, the mass, presence of a trailer, etc., and the mission of the motor vehicle carried out, for example the average speed when in motion, the percentage of time when stationary, altimetric changes, etc.; and Definition, within the respective variation ranges, of the good values and bad values for the selected objective physical quantity, to which the maximum benefits and minimum benefits are respectively made to correspond. As indicated in the previous point, it should be noted that the good and bad values for a selected objective physical quantity are not fixed, but a function of the characteristics of the motor vehicle and the mission carried out.

The computation of each of the above-listed indices and the associated weights and benefits are described below in greater detail.

1. Fuel Economy Index (FEI)

This summary index is computed as a linear combination of the following two pre-summary indices:

a Preventive Driving Index (PDI), and
a Gearshifting Index (GSI),
according to a relation of the following type:

$$FEI = k_0 \cdot PDI + k_1 \cdot GSI$$

where each of the two coefficients $k_0$ and $k_1$ is equal to the product of the weight w and the benefit b associated with the respective pre-summary index, namely:

$$k_i = w_i \cdot b_i$$

In particular, the benefits associated with the two pre-summary indices PDI and GSI are determined through statistical analysis based on the frequency of occurrence of significant events in the mission under review with respect to the missions used for tuning the pre-summary indices, i.e. high benefit if the event occurs relatively often and low benefit if the event is rare. The weights associated with the two pre-summary indices PDI and GSI are instead determined by statistical analysis regarding the importance of the analysed parameter in the overall reduction of fuel consumption.

These two pre-summary indices are determined in the manner described below.

1.1. Preventive Driving Index (PDI)

This pre-summary index provides information on the actions taken by the driver in order to achieve a preventive driving style and consequently reduce fuel consumption, and is computed as a linear combination of the following partial indices:

an Acceleration Style Index (ASI),
a Delay Gas-Brake Index (DGBI),
a Braking Frequency Index (BFI), a Braking Wasted Energy Index (BWEI), and
a Stop Approach Index (SAI),
according to a relation of the type:

$$PDI = k_2 \cdot ASI + k_3 \cdot DGBI + k_4 \cdot BFI + k_5 \cdot BWEI + k_6 \cdot SAI$$

These partial indices are computed in the manner described below.

1.1.1. Acceleration Style Index (ASI)

This partial index is intended to reward the ability of the driver to maintain a driving style free of continual acceleration and slowing down on typically suburban and motorway stretches of road. Stretches of road driven along without engine speed and torque fluctuations reward the driving style of the motor vehicle driver.

This index is computed at points of the mission where:
  there has been no changing of gear for a certain interval of time, for example, several seconds or a few tens of seconds, or, from the other perspective, the currently engaged gear has remained engaged for this interval of time; and
  the cruise control is not active.

In particular, in each of the points that satisfy these requirements, the difference in fuel consumption is computed between the fuel consumption computed on the basis of the instantaneous values of available engine torque and engine speed of the mission and the fuel consumption computed on the basis of the average value of available engine speed and torque within a time frame of specific duration, for example a few tens of seconds, centred on the point considered (filtered values).

The thus computed difference represents the fuel saving, expressed in [L/km], computed with reference to valid stretches of road, or rather those where changing gear is sufficiently rare, which is normalized with respect to the mass of the motor vehicle (acquired from the CAN and stored in the data logger 4) and the average speed of the motor vehicle when travelling, thus giving rise to the Acceleration Style Index ASI.

The coefficient $k_2$ associated with this partial index is equal to the product of a respective benefit, which is computed on the basis of the percentage of distance travelled by the motor vehicle during the mission in which the fuel economy is computed, and a respective weight, which is instead determined by statistical analysis regarding the importance of this partial index in the overall reduction of fuel consumption.

1.1.2. Delay Gas-Brake Index (DGBI)

This partial index provides information on the correct operation of the accelerator pedal before operating any of the braking devices of the motor vehicle in order to correctly exploit the fuel cutoff of the motor vehicle internal combustion engine in the phases of slowing down the motor vehicle and consequently save fuel.

In particular, every time that the accelerator pedal is released and any of the braking devices is operated within a calibratable interval of time, for example a few seconds, then the delay between the two actions on the primary controls is computed. Small delays are indicative of a not very preventive driving style and are therefore penalized. Thus, a respective Delay Gas-Brake Index is computed for each event, normalizing the individual delay with respect to the mass of the motor vehicle (acquired from the CAN and stored in the data logger 4) and the instantaneous speed of the motor vehicle at the moment of releasing the accelerator pedal.

At the end of the mission, the Delay Gas-Brake Index DGBI is computed as the arithmetic average of the indices of the individual events.

The coefficient $k_3$ associated with this partial index is equal to the product of a respective benefit, which is computed on the basis of the number of delays (between release of the accelerator pedal and operation of any braking device) per kilometer, and a respective weight, which is instead determined by statistical analysis regarding the importance of this partial index in the overall reduction of fuel consumption.

Therefore, low speeds equate to high benefits as they are indicative of many braking events.

1.1.3. Braking Frequency Index (BFI)

This partial index is computed upon detecting the operation of any of the braking devices of the motor vehicle as the percentage of time on the motor vehicle mission spent braking. This percentage value is then normalized with respect to the average speed of the motor vehicle when travelling.

The coefficient $k_4$ associated with this partial index is equal to the product of a respective benefit, which is defined as the variance of the normalized percentage value with respect to the good and bad values for the index, and a respective weight, which is instead determined by statistical analysis regarding the importance of this partial index in the overall reduction of fuel consumption.

Figure 3:
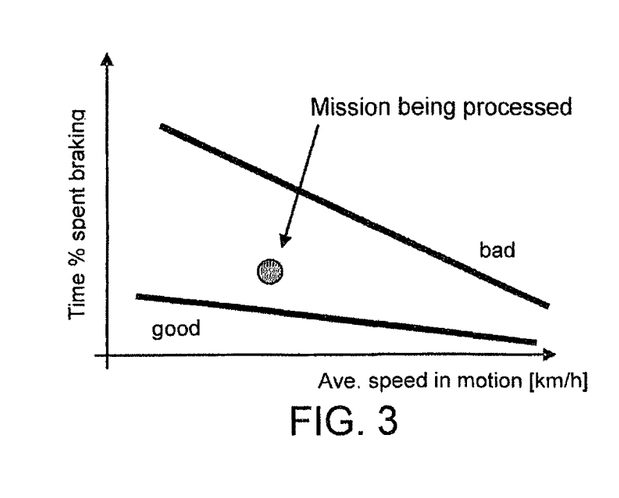
FIGS. 3-4 and 6-10 show graphs of the physical quantities involved in the motor vehicle driving style evaluation.

The quantification of this variance is graphically illustrated in FIG. 3; in other words it is carried out on the basis of the position assumed by the partial index on a plane defined by the above-mentioned average speed of the motor vehicle in motion and percentage of time of the motor vehicle mission spent braking, with respect to a line of good and a line of bad operation of the braking devices, respectively defined by corresponding sets of good and bad values for the Braking Frequency Index BFI.

1.1.4. Braking Wasted Energy Index (BWEI)

This partial index quantifies the percentage of energy dissipated in any of the braking devices of the motor vehicle with respect to the overall energy of the mission.

Given EnA as the energy associated with the mission and computed on the basis of the engine torque and engine speed data stored in the data logger 4, and dEC as the energy dissipated in braking, comprising the kinetic energy, the gravitational potential energy and the power lost in coast-down during each braking event, this index is computed by means of the following formula:

$$BWEI = \frac{dEC}{\int EnA \cdot dt} \cdot 100$$

This value is then normalized with respect to:
  the mass of the motor vehicle (stored in the data logger 4); and
  the average speed of the motor vehicle, when in motion, during the mission.

The coefficient $k_5$ associated with this partial index is equal to the product of a respective benefit, which is defined as the variance of the partial index with respect to the good and bad values for this partial index, and a respective weight, which is instead determined by means of a statistical analysis regarding the importance of the analysed index in the overall reduction of fuel consumption.

Figure 4:
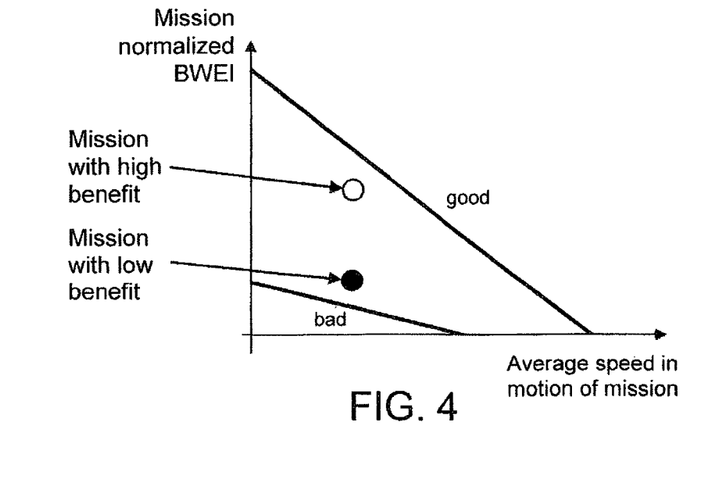

The quantification of the above-mentioned variance is graphically illustrated FIG. 4; in other words on the basis of the position assumed by the partial index on a plane defined by the average speed of the motor vehicle, when in motion, and by the normalized values of the partial index, with respect to a line for good and a line of bad operation, defined by corresponding sets of good and bad values for this partial index.

1.1.5. Stop Approach Index (SAI)

This partial index is intended to penalize an approach to stopping the motor vehicle carried out in a manner incompatible with fuel economy.

In fact, if the motor vehicle is about to stop, because forced to by traffic or road conditions, or by the driver's choice or need, the most convenient way for the purposes of saving fuel is to combine the release of the accelerator pedal (engine cutoff) with changing up a gear, using a lower ratio compatible with reducing engine speed (engine run down) and only using one of the motor vehicle braking devices in the last part of the manoeuvre. On the other hand, a driver who, although having to stop the motor vehicle, keeps the accelerator pressed until almost on top of the stopping point, must necessarily brake hard, thus having a stop approach incompatible with saving fuel.

This partial index therefore assumes a high value in the case where the driver widely uses the first stop approach mode and a low value otherwise.

Going into greater depth, the computation of this partial index is based on the natural (spontaneous) deceleration curve of the motor vehicle, which, starting from the maximum speed that the motor vehicle can reach, defines the reduction in speed against time in the case where the driver leaves the engine in fuel cut-off mode and engages the highest gear permitted with the current engine speed.

Figure 5:
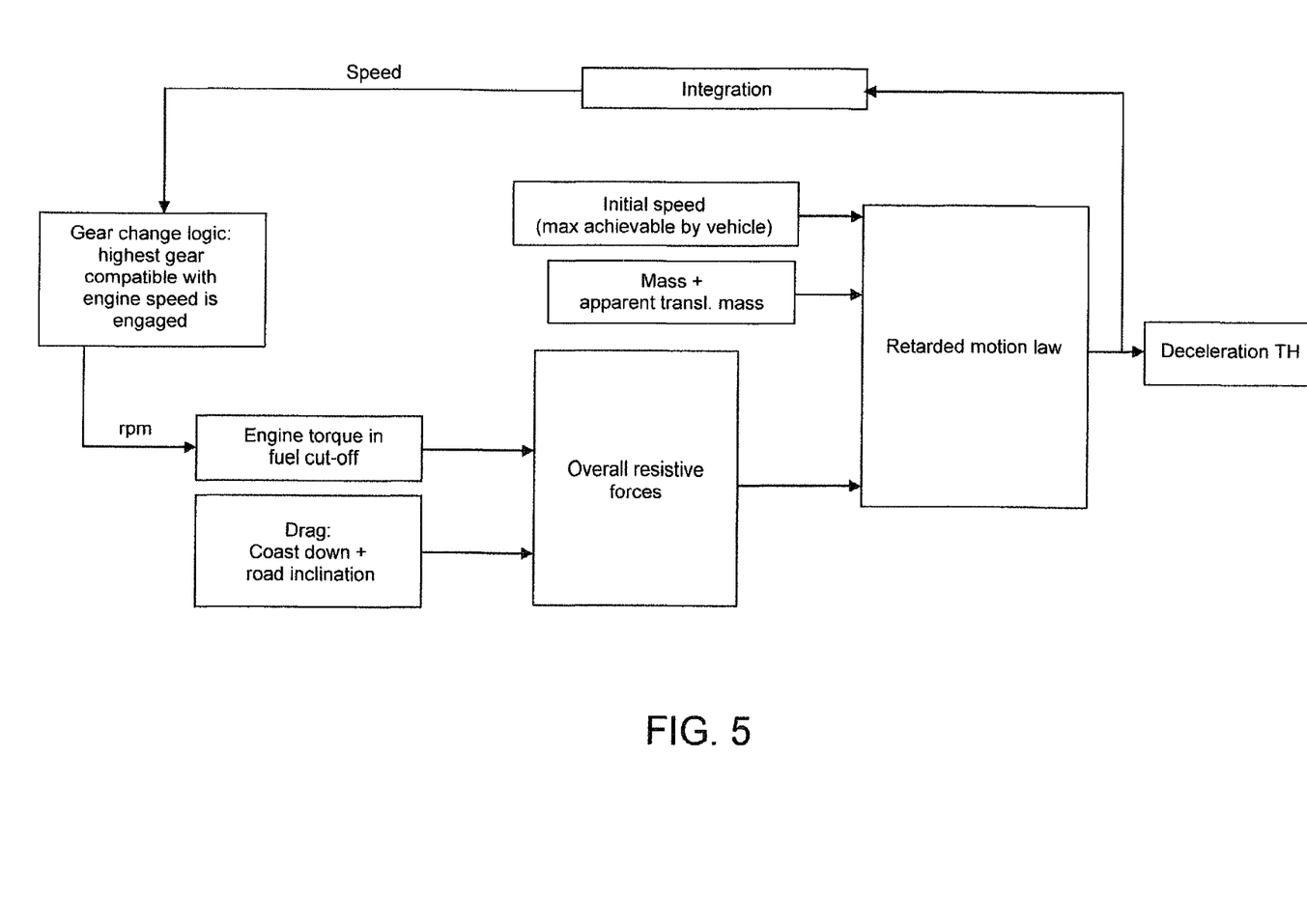
FIG. 5 shows a functional block diagram of a mathematical simulation model through which it is possible to compute a natural motor vehicle deceleration curve.

This curve is stored in the electronic control unit of the motor vehicle and is obtained by means of a simulation carried out with a computation model having the structure shown in FIG. 5.

Figure 6A:
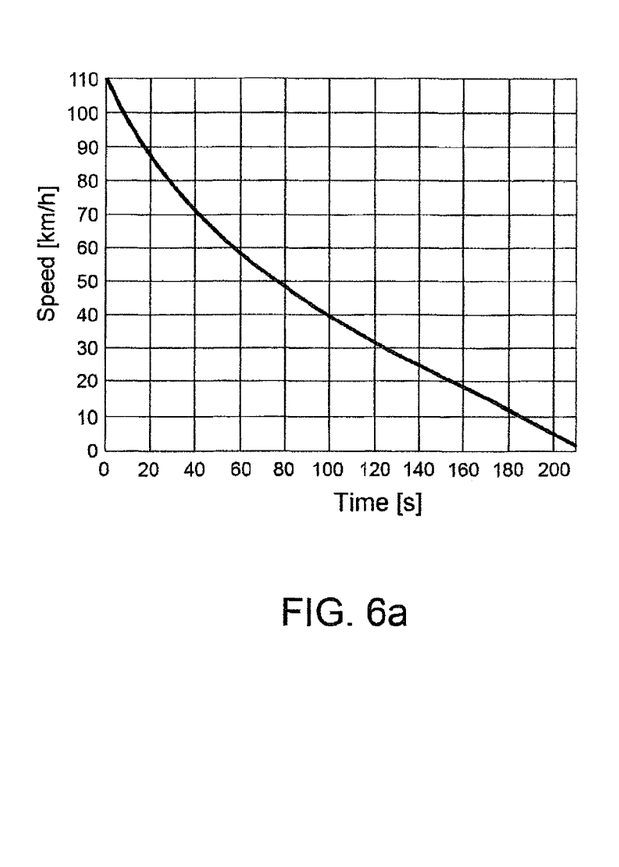
Figure 6B:
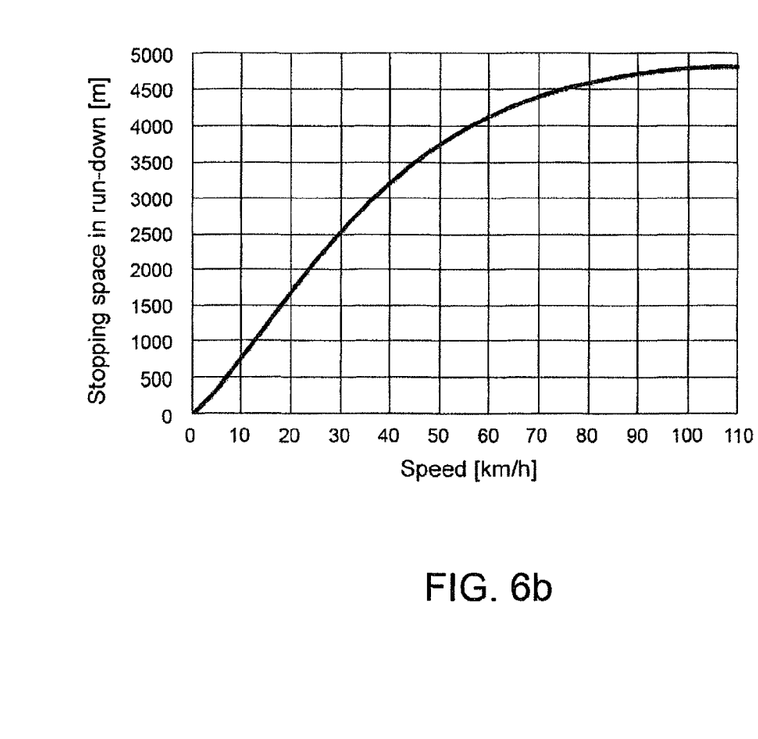

An example of a natural deceleration curve of a motor vehicle is provided in the graphs shown in FIGS. 6a and 6b.

Figure 7:
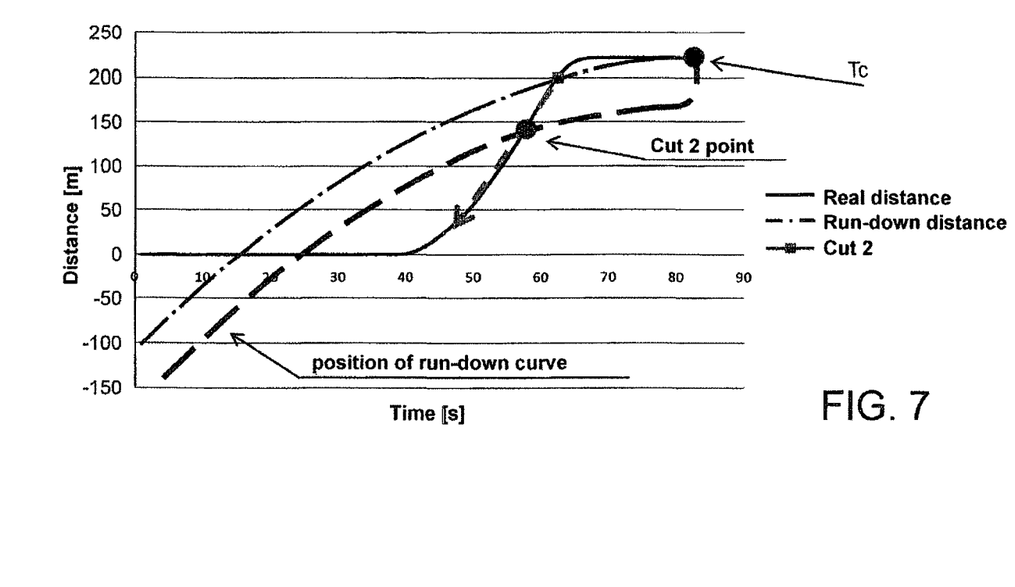

The computation of this partial index based on this curve is performed every time the motor vehicle stops (speed of the motor vehicle, provided by the CAN network, drops below a very low threshold). As shown in FIG. 7, starting from the stationary motor vehicle condition ("Tc"), the curve regarding the distance effectively covered to arrive at the stop is used "backwards" to identify the point indicated in FIG. 7 as "Cut 2". In particular, starting from "Tc", all of the points of intersection between the curve representing the distance effectively covered and the curve representing the distance covered in run-down (making the second curve pass over the first) are determined: the point "Cut 2" is then defined as the point beyond which the space for stopping in run-down is less than the space effectively travelled. If it exists, the motor vehicle could have covered the stretch of road between point "Cut 2" and point "Tc" in fuel cutoff mode. In correspondence to this, an interval of time is defined in which the motor vehicle could have travelled in fuel cutoff mode.

In the example shown in FIG. 7, the fuel saving FSes that could have been achieved is:

$$FSes = \int_{taglio2}^{Tc} fuel\_rate \cdot dt$$

Since this regards a single stop of the motor vehicle during the mission, the fuel saving computed according to the above-indicated formula will henceforth identified by the term "single event fuel saving".

Figure 8A:
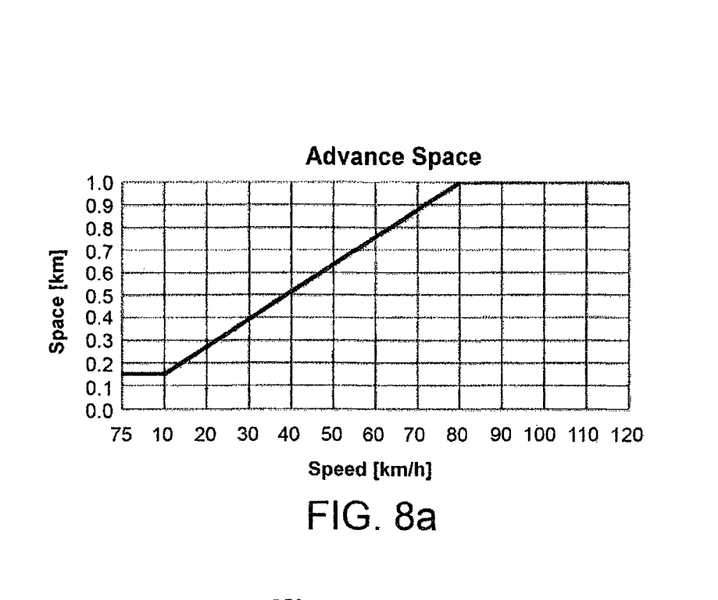
Figure 8B:
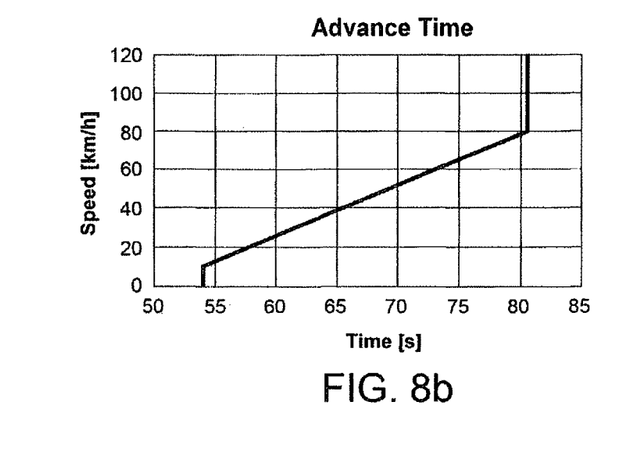

The point "Cut 2" is searched for backwards for a maximum space, called the "Advance Space", which depends on the speed of the motor vehicle; this then has a corresponding "Advance Time", as shown in FIGS. 8a and 8b. If point "Cut 2" does not exist, then a distance equal to the Advance Space is considered to be the distance that could be covered in fuel cutoff mode.

The single event fuel saving FSes is computed for every recognised stop, with reference to "Cut 2", except in cases where:

during the stop approach and for a distance not exceeding the "Advance Space", the motor vehicle encounters a bend with a radius below a certain value, this situation being detected on the basis of the yaw speed, as explained in greater detail further on: in this case, the "forward" search for point "Cut 2" is interrupted when a bend with the aforesaid characteristics is encountered as the driver's visibility is impaired by the road bend; in this case, the interval of time considered in the computation is that between the stop and identifying the presence of the bend; and a distance equal to the "Advance Space" is travelled backwards: in this case, the search for point "Cut 2" is interrupted and the time considered valid for the computation is the corresponding "Advance Time".

Therefore, given T* as the start time for the fuel saving integration according to the above-indicated formula, this can be equal to the time corresponding to point "Cut 2", or the time corresponding to encountering the presence of a bend with the aforesaid characteristics or the Advance Time.

The fuel saving computed for the motor vehicle entire mission is given by:

$$\text{Fuel\_save} = \sum_i \int_{T^*}^{T_{c_i}} \text{fuel\_rate} \cdot dt$$

where 'i' indicates the stretches of road where the motor vehicle makes a stop during the mission.

The Stop Approach Index SAI is based on the fuel saving computed for the motor vehicle entire mission, which is opportunely calibrated to take into account a load-related corrective factor and is normalized for the interval of time over which the fuel saving computation was performed.

Figure 9:
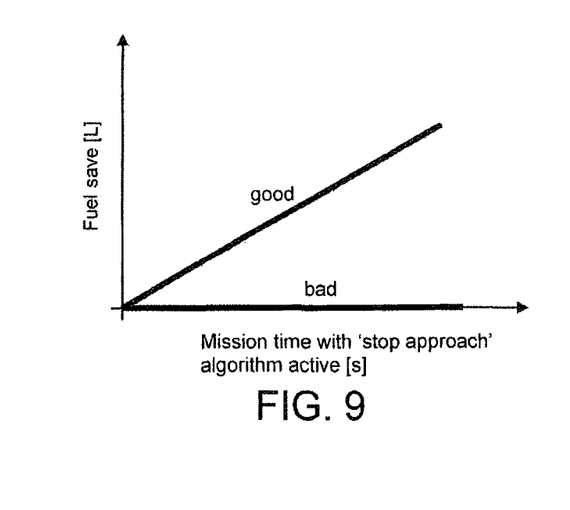

In detail, the Stop Approach Index SAI is computed as follows:

$$\text{Index} = \frac{\sum \text{index}_i \cdot \text{benefit}_i}{\sum \text{benefit}_i}$$

where the term $\text{benefit}_i$ represents the benefit of the i'th stop, defined as the distance of the point on the plane in FIG. 9 that represents the i'th stop, a point that, as stated, represents the fuel saving associated with the i'th stop with respect to the good and bad lines, experimentally set, which represent the good and bad fuel economy values: the closer the point representing the i'th stop is to the good line, the greater is its benefit.

The coefficient $k_6$ associated with this partial index is equal to the product of a respective benefit, computed as:

$$\text{Benefit} = \frac{\text{number\_stop\_app\_per\_km}}{p\_st} \cdot \frac{\text{benefit\_m}}{10} \cdot B_0$$

where p_st represents a reference, determined by statistical analysis, to evaluate the influence of number_stop_app_ per_km in the Benefit computation, benefit$_m$ represents the mean benefit of the mission and term $B_0$ represents a reference, experimentally determined, and a respective weight, which is instead determined by statistical analysis regarding the importance of this partial index in the overall reduction of fuel consumption.

1.2. Gearshifting Index (GSI)

This pre-summary index provides information on the gear changing manoeuvres made by the driver of the motor vehicle in order to obtain correct use of the gears to reduce fuel consumption, and is computed as a linear combination of the following partial indices:
- a Gear Shift Indicator Fuel Save Index (GSIFSI), and
- an Erroneous Gearshifting Index (EGSI), according to a relation of the following type:

$$GSI = k_7 \cdot GSIFSI + k_8 \cdot EGSI$$

These partial indices are computed as described below.

1.2.1. Gear Shift Indicator Fuel Save Index (GSIFSI)

This partial index quantifies the fuel saving that would have been achieved if the driver had changed gear as suggested by a gear shift indicator, which operates according to logic in which engagement of the next higher gear is suggested when the engine power supplied with the current gear is greater than or equal to the engine power that would be supplied if in the higher gear, otherwise keeping the current gear is suggested.

Hence, to compute this partial index, first of all of the data concerning the gear changes made during motor vehicle mission is reprocessed, thereby computing a new data series (time history) of gear changes and corresponding engine speeds.

After this, the fuel consumption that would have been obtained with the suggested gear changes is computed (GSI-compliant fuel consumption).

Finally, this partial index is computed on the basis of the difference between the fuel consumption effectively achieved (determined from data provided from the CAN network) and the fuel consumption that would have been achieved with the suggested gear changes.

The coefficient $k_7$ associated with this partial index is equal to the product of a respective benefit, which is determined in a similar manner to those associated with the Stop Approach Index SAI and the Braking Wasted Energy Index BWEI, namely based on the variance of the partial index from sets of good and bad values for this index, and a respective weight, which is instead determined by means of a statistical analysis regarding the importance of the analysed index in the overall reduction of fuel consumption.

1.2.2. Erroneous Gear Shift Index (EGSI)

The computation of this index is based on the number of erroneous gear changes per 100 km. In particular, every time a gear is changed and within a given calibratable interval of time, for example a few seconds, another gear change is performed, then a counter is incremented.

At the end of the motor vehicle mission the counter value is then normalised with respect to a distance of 100 km, also taking into account the number of gear ratios.

The coefficient $k_8$ associated with this partial index is equal to the product of a respective benefit, which is determined in a similar manner to that associated with the GSI (Gear Shift Indicator) Fuel Save Index GSIFSI, namely based on the variance of the index from sets of good and bad values for this partial index, and a respective weight, which is instead determined by means of a statistical analysis regarding the importance of the analysed index in the overall reduction of fuel consumption.

2. Auxiliary Brake Usage Index

This summary index provides cumulative information on the correct use or otherwise of the motor vehicle auxiliary braking devices from the viewpoint of basic brake conservation.

The channels of the CAN network acquired are sufficient to discriminate between all the types of brake: both usage of the brake pedal and usage of the engine brake and retarder are identified by the respective channels acquired on the CAN network bus. It is presumed that in normal driving conditions the correct sequence for using the three types of brake is:

Engine brake->Retarder->Brake pedal

The evaluation algorithm for the usage of braking devices is designed to reward the driver in the case where the above-indicated sequence is used and so assigns a high score to this sequence and a low score otherwise.

The algorithm functions as follows:
indicating as N the number of braking events performed at an initial speed of the motor vehicle greater than a threshold speed $V_0$;
considering the first braking event, if the sequence of the brakes used is different from that indicated above, a zero-initialised counter NUM is incremented by one unit;
the above-defined step is repeated for all N braking events of the mission;
the auxiliary brake usage index is then computed as follows:

$$ABUI = 100 - \left(\frac{NUM}{N}\right) \cdot 100$$

3. Degree of Difficulty Index (DoDI)

This summary index provides indications on the degree of difficulty of the mission tackled by the motor vehicle in order to be able to weigh the driving style of the motor vehicle driver on the basis of the route followed. Given that the driving style of the motor vehicle driver is evaluated in an aggregate manner via the three above-mentioned Summary Indices, this provides an evaluation of the level of severity of the route followed, together with an evaluation of the macro conditions of the motor vehicle employed (load and drag); in fact, very often the inability to implement a driving style that enables fuel economy is due to the particular difficulty of the route followed and/or poor state of the motor vehicle employed.

The greater the difficulty of the mission tackled, the greater the value of this summary index.

This summary index is computed as a linear combination of the following pre-summary indices:
- a Mission Severity Index (MSI), and
- a Vehicle Load and Drag Index (VLDI), according to a relation of the following type:

$$DoDI = k_9 \cdot MSI + k_{10} \cdot VLDI$$

where the coefficients $k_9$ and $k_{10}$ represent the weights of the pre-summary indices determined through statistical analysis regarding the importance of the pre-summary indices in the overall reduction of fuel consumption.

3.1 Mission Severity Index (MSI)

This pre-summary index provides information on the degree of severity of the route followed by the motor vehicle during the mission, from the viewpoint of twists and turns, weather conditions, the speed profile maintained and the altimetric characteristics. The greater the difficulty of the mission tackled, the greater the value of the Mission Severity Index.

This pre-summary index is computed as a linear combination of the following partial indices:
- a Speed Profile Index (SPI),
- an Altimetry Index (AI),
- a Twisting Index (TI),
- a Meteo Index (MI), according to a relation of the following type:

$$MSI = k_{11} \cdot SPI + k_{12} \cdot AI + k_{13} \cdot TI + k_{14} \cdot MI$$

where the coefficients $k_{11}$ to $k_{14}$ represent the weights of the partial indices determined through statistical analysis regarding the importance of the partial indices in the overall reduction of fuel consumption.

3.1.1. Speed Profile Index (SPI)

This partial index discriminates between travelling on motorways, urban and suburban roads. The more the distance travelled approaches the urban type, the greater the value of the index.

Given V as the average speed of the motor vehicle in motion and %StopTime as the time percentage of the mission in which the motor vehicle is stationary, this partial index is computed as follows:

$$speed\_profile = A - \frac{B}{C + D \cdot (V - E)^F + G \cdot \left(\frac{\% \ Stop\_time}{100}\right)^H} \cdot L$$

where the other parameters are scalar values, set on the basis of time history data such that the index has a value between 0 and 100%.

3.1.2. Altimetry Index (AI)

This partial index is indicative of the altimetric characteristics of the motor vehicle route, based on altimetric data provided by the onboard satellite global positioning system (GPS) through the CAN network.

The more the route followed is characterized by continuous ups and downs, the higher the value of the index. In particular, given:
- mainly_uphill as the time percentage of the mission spent going uphill; and
- ups_and_downs as the mission time spent travelling with irregular altimetric changes and therefore not exclusively all downhill or all uphill);

the Altimetry Index AI is computed as follows:

$$Altimetry\_index = A \cdot [(B \cdot ups\_and\_downs) + (ups\_and\_downs \cdot mainly\_uphill) \cdot 0.7 + C]$$

where A, B and C are experimentally defined weighting coefficients.

3.1.3. Twisting Index (TI)

This partial index is indicative of the twist and turn characteristics of the motor vehicle route.

The more the route followed is characterized by bends with predefined curvature, the higher the value of the index.

The yaw speed is computed starting from the speeds of the wheels on a same axle, provided by the CAN network, using the basic kinematic relation that links forward speed to yaw speed via the track of the motor vehicle.

Based on the yaw speed, the motor vehicle route is then subdivided between:
- Straight route;
- Route characterized by tight bends (computed radius of curvature less than a threshold, for example 40 m); and
- Route characterized by broad bends, (computed radius of curvature greater than a threshold, for example 300 m).

Finally, the Twisting Index TI is computed as the predominance of tight bends over broad bends.

3.1.4. Meteo Index (MI)

This partial index is indicative of the meteorological conditions along the route followed by the motor vehicle, determined by analysis of the average ambient temperature and the percentage of time for which the windscreen wipers were operating with respect to the total mission time.

The lower the average ambient temperature and the higher the time for which the windscreen wipers were operating, the higher the value of the index.

Starting from the average ambient temperature $T_{AV}$ and the time percentage %WW of windscreen wiper operation during the motor vehicle mission, the Meteo Index MI is computed as follows:

$$MI = V - e_0 \cdot T_{AV} + e_1 \cdot \% WW$$

where V, $e_0$ and $e_1$ are determined experimentally.

3.2. Vehicle Load and Drag Index (VLDI)

This pre-summary index provides the evaluation of the macro conditions of the motor vehicle used on the mission from the viewpoint of load and drag.

The higher the load on the motor vehicle and/or the higher the drag, the greater the value of the index.

The index computed as a linear combination of the following partial indices:
- a Vehicle Load Index (VLI), and
- a Coasting Resistance Index (CRI), according to a relation of the following type:

$$VLDI = k_{15} \cdot VLI + k_{16} \cdot CRI$$

where the coefficients $k_{15}$ and $k_{16}$ represent the weights of the partial indices determined through statistical analysis regarding the importance of the partial indices in the overall reduction of fuel consumption.

3.2.1. Vehicle Load Index (VLI)

This partial index provides the evaluation of the load conditions on the motor vehicle, in the sense that the higher the onboard load, the more substantial the fuel demand necessary for travelling. Therefore, the higher the load, the greater the index value.

In fact, the mass of the motor vehicle, especially when it is a medium-to-heavy commercial vehicle, represents a significant discriminant between its conditions of use: unladen, half loaded, fully loaded and possibly overloaded.

Figure 10:
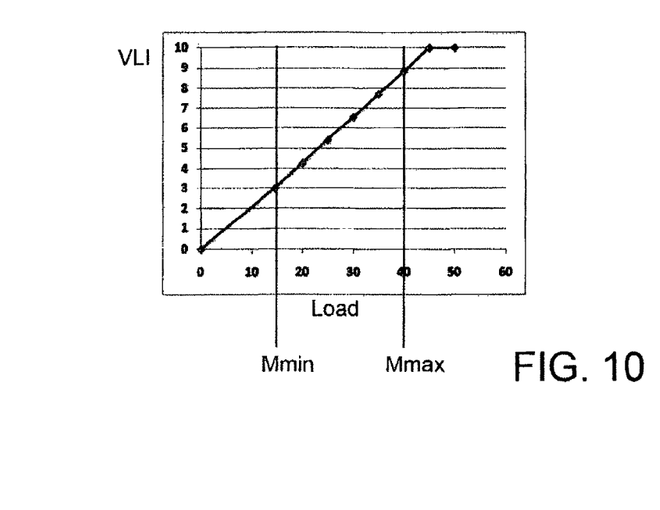

Therefore, the Vehicle Load Index VLI is computed on the basis of the mass of the motor vehicle, provided by the CAN network, and an opportunely calibrated table of the type shown in FIG. 10, in which experimentally determined Vehicle Load Index VLI values are stored as a function of the mass M of the motor vehicle.

3.2.2. Coasting Resistance Index (CRI)

Figure 11:
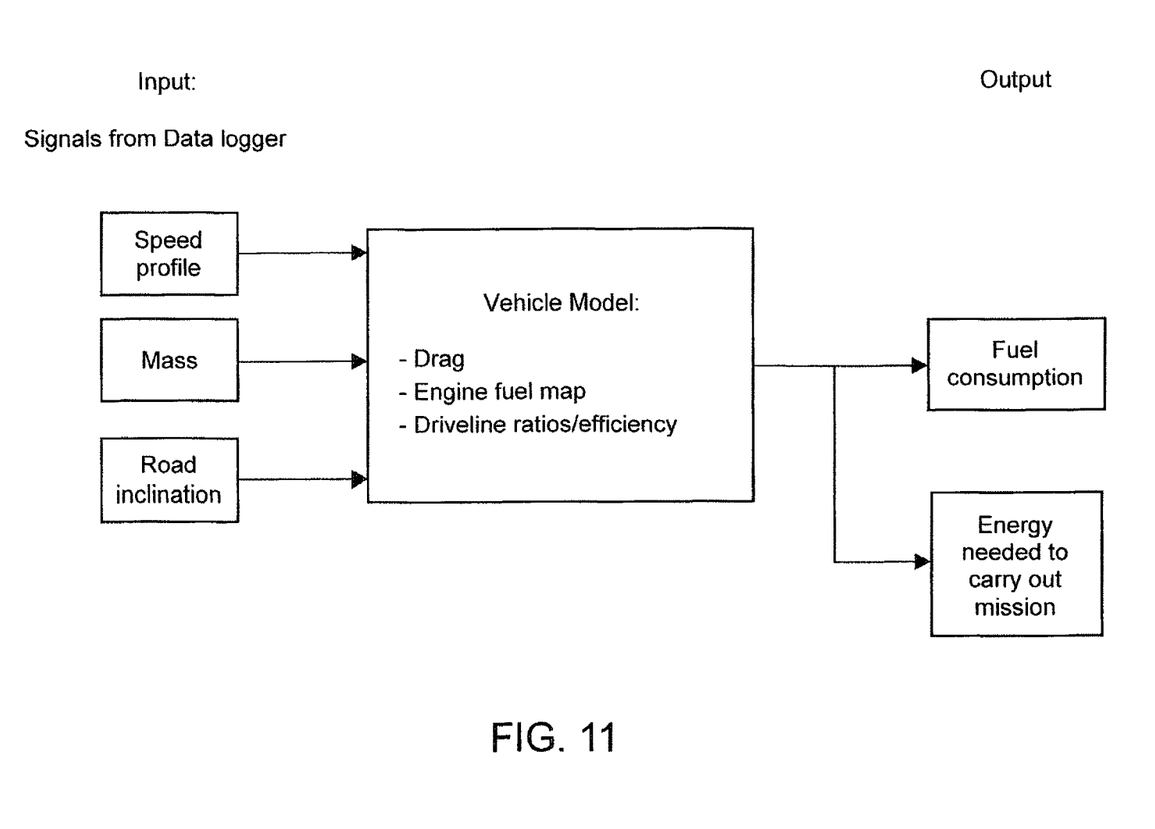
FIG. 11 shows a functional block diagram of a simplified motor vehicle mathematical model that enables the difference between an effective motor vehicle fuel consumption and a rated motor vehicle fuel consumption to be quantified.

This partial index quantifies the difference between the effective fuel consumption of the motor vehicle and the rated fuel consumption of the motor vehicle, using a simplified mathematical model of the motor vehicle (a functional block diagram of which is shown in FIG. 11) that defines, on the one hand, the relation existing between the fuel consumption of the motor vehicle and the energy necessary for it to carry out the mission, and, on the other hand, the speed profile of the motor vehicle during the mission, the mass of the motor vehicle and the inclination of the road driven along during the mission, as a function of the drag on the motor vehicle, the engine fuel map and the gear ratios and efficiency of the motor vehicle driveline.

In particular, given:

ΔC as the difference between the effective fuel consumption of the motor vehicle and the fuel consumption of the motor vehicle computed by means of the simplified mathematical model;

ΔE as the difference between the energy measured on the motor vehicle mission and the energy computed for the same mission by means of the simplified mathematical model;

ΔM as the mean of ΔC and ΔE;

the Coasting Resistance Index CRI is computed as follows:

$$CRI = h_0 + h_1 \cdot \Delta M^2$$

where $h_0$ and $h_1$ are two scalar tuning coefficients set on the basis of time history data.

The invention claimed is:

1. A driving style evaluation system for a motor vehicle, comprising:
   a processor configured to receive and process motor vehicle-related data and motor vehicle mission-related data to compute a Driving Style Evaluation Index indicative of the driving style of a motor vehicle driver during a motor vehicle mission from a motor vehicle fuel consumption perspective, based on the following summary index:
   Fuel Economy Index, which is indicative of the driving style of the motor vehicle driver from the fuel saving perspective, and is computed based on pre-summary indices computed based on respective partial indices in turn computed based on the following physical quantities which affect the motor vehicle fuel consumption:
   time interval, ending with a motor vehicle stop, during which the motor vehicle speed reduction is mainly due to a combination of a gas pedal release and a gear downshift, possibly with operation of at least one motor vehicle braking system only during the final part of the maneuver;
   at least one of:
      engine speed and torque fluctuations within preset time intervals; and
      time elapsed between a gas pedal release and operation of at least one motor vehicle braking system;
   at least one of:
      time during which at least one motor vehicle braking system is operated; and
      amount of energy dissipated by at least one motor vehicle braking system;
   and at least one of:
      engine power and instantaneous fuel consumption in different gears; and
      time interval between two consecutive gear shifts;
   and wherein the pre-summary and partial indices are weighted by respective dynamic weighting coefficients, each of which is computed based on a respective motor vehicle mission-independent weight, which is indicative of the influence that the physical quantities based on which the Fuel Economy Index is computed have on the overall fuel consumption reduction, and based on a respective motor vehicle mission-dependent benefit, which represents an evaluation of the benefit that the Fuel Economy Index provides in the driving style evaluation during the motor vehicle mission.

2. The driving style evaluation system of claim 1, further configured to compute the Fuel Economy Index based on the following pre-summary indices and corresponding dynamic weighting coefficients:
   Preventive Driving Index, which is indicative of driver-performed actions aimed at achieving a preventive driving and consequently reducing fuel consumption, and is computed based on:
      the time interval, ending with a motor vehicle stop, during which the motor vehicle speed reduction is mainly due to a combination of a gas pedal release and a gear downshift, possibly with operation of at least one motor vehicle braking system only during the final part of the maneuver;
      at least one of:
         the engine speed and torque fluctuations within preset time intervals; and
         the time elapsed between a gas pedal release and operation of at least one motor vehicle braking system;
      and at least one of:
         the time during which at least one motor vehicle braking system is operated; and
         the amount of energy dissipated by at least one motor vehicle braking system; and
   Gear shifting Index, which is indicative of driver-performed gear shifting aimed at properly using the gears to reduce fuel consumption, and is computed based on:
      the engine power and instantaneous fuel consumption in different gears; and
      the time interval between two consecutive gear shifts.

3. The driving style evaluation system of claim 2, further configured to compute the Preventive Driving Index based on one or more of the following partial indices and corresponding dynamic weighting coefficients:
   Stop Approach Index, which is indicative of a compatibility of a motor vehicle stop approach with fuel saving, and is computed based on the time interval, ending with a motor vehicle stop, during which the motor vehicle speed reduction is mainly due to a combination of a gas pedal release and a gear downshift, possibly with operation of at least one motor vehicle braking system only during the final part of the maneuver;
   Acceleration Style Index, which is indicative of ability of the driver to maintain a driving style free of continual acceleration and slowing down on certain types of route, typically suburban and on motorways, and is computed based on the engine speed and torque fluctuations within preset time intervals;
   Delay Gas-Brake Index, which is indicative of correct operation of the accelerator pedal before operating any of the motor vehicle braking devices with the purpose of correctly exploiting motor vehicle internal combustion engine fuel cut-off during motor vehicle slowing down, and is computed based on the time elapsed between a gas pedal release and operation of at least one motor vehicle braking system;
   Braking Frequency Index, which is indicative of the braking time during the motor vehicle mission, and is computed based on the time during which at least one motor vehicle braking system is operated; and
   Braking Wasted Energy Index, which is indicative of the energy dissipated by any motor vehicle braking systems compared to the overall mission energy, and is computed based on the amount of energy dissipated by at least one motor vehicle braking system.

4. The driving style evaluation system of claim 1, further configured to compute the Gear shifting Index based on the following partial indices and corresponding dynamic weighting coefficients:
   Gear Shift Indicator Fuel Save Index, which is indicative of fuel saving that would have been achieved if the gears had been changed as suggested by a gear shift indicator, and is computed based on the engine power and instantaneous fuel consumption in different gears; and Erroneous Gear shifting Index, which is indicative of a number of erroneous gear shifting during the motor vehicle mission, and is computed based on the time interval between two consecutive gear shifts.

5. The driving style evaluation system of claim 1, further configured to compute the Driving Style Evaluation Index also based on the following supplementary summary index:

Auxiliary Brake Usage Index, which is indicative of the usage of motor vehicle auxiliary braking systems from a motor vehicle basic brake saving perspective.

6. The driving style evaluation system of claim 5, further configured to compute the Auxiliary Brake Usage Index by:

determining, for each braking event performed with the initial speed of the motor vehicle higher than a threshold speed, whether the operation sequence of the motor vehicle braking devices corresponds to a predetermined operation sequence considered optimal from fuel saving perspective; and computing the Auxiliary Brake Usage Index based on a number of braking events performed according to the predetermined operation sequence.

7. The driving style evaluation system of claim 1, further configured to compute the Driving Style Evaluation Index also based on the following supplementary summary index:

Degree of Difficulty Index, which is indicative of an overall motor vehicle mission difficulty, based on pre-summary and partial indices weighted by respective static weighting coefficients, each of which is computed solely based on a respective motor vehicle mission-independent weight, and fails to take into account a respective motor vehicle mission-dependent benefit.

8. The driving style evaluation system of claim 7, further configured to compute the Degree of Difficulty Index based on the following pre-summary indices and corresponding static weighting coefficients:

Mission Severity Index, which is indicative of a degree of severity of the route travelled by the motor vehicle during the mission, from the perspective of twists and turns, weather conditions, speed profile maintained and altimetric characteristics; and Vehicle Load and Drag Index, which is indicative of macro conditions of the motor vehicle used on the mission from the load and drag perspective.

9. The driving style evaluation system of claim 8, further configured to compute the Mission Severity Index based on the following partial indices and corresponding static weighting coefficients:

Speed Profile Index, which enables travelling on motorways, urban and suburban roads to be discriminated;

Altimetry Index, which is indicative of altimetric characteristics of the route travelled by the motor vehicle;

Twisting Index, which is indicative of twist and turn characteristics of the route travelled by the motor vehicle; and Meteo Index, which is indicative of meteorological conditions along the route travelled by the motor vehicle.

10. The driving style evaluation system of claim 8, further configured to compute the Vehicle Load and Drag Index based on the following partial indices and corresponding static weighting coefficients:

Load Index, which is indicative of motor vehicle load conditions, such that the higher the on-vehicle load, the more substantial the fuel demand necessary for travelling; and Coasting Resistance Index, which enables difference between effective motor vehicle fuel consumption and the rated motor vehicle fuel consumption to be quantified.

11. The driving style evaluation system of claim 8, wherein the weighting coefficients are predetermined based on good values and bad values of the physical quantity represented by the relevant index, to which the maximum weights and the minimum weights are respectively caused to correspond.

12. The driving style evaluation system of claim 8, comprising:

an on-vehicle electronic equipment designed to be mounted on the motor vehicle and comprising:

a data logger designed to interface with a Controller Area Network of the motor vehicle to download and store mission-related data of the motor vehicle necessary for evaluation of the motor vehicle driving style;

a radio transmitter device designed to interface with the data logger to acquire and radio transmit the mission-related data collected thereby; and the data processing device designed to interface with the data logger to acquire and process the collected mission-related data to on-board evaluate motor vehicle driving style; and a ground station designed to cooperate with the on-vehicle electronic equipment to carry out an off-board evaluation of the motor vehicle driving style, and comprising:

a radio receiver device designed to receive the mission-related data radio transmitted by the radio transmitter device of the on-vehicle electronic equipment; and a data processing server designed to interface with the radio receiver device to acquire and process the received mission-related data to off-board evaluate the motor vehicle the driving style; and wherein the data processing device and the data processing server are programmed to analyze the mission-related data and evaluate the motor vehicle driving style, and outputting the following information:

Summaries on the motor vehicle mission from engine starting until the subsequent stopping engine; and Summaries on the motor vehicle mission from when an onboard computer was reset by the driver;

and wherein the data processing device is further programmed to output the following additional information:

Ratings on individual events constituted by specific driver-performed maneuvers: when an event is recognized from a series of contemplated events, it is processed and the performed maneuver is rated, providing the driver with a fuel saving-aimed rating.

13. A driving style evaluation software for a motor vehicle, loadable in a processor of a driving style evaluation system and programmed to cause, when executed, the driving style evaluation system to become configured as claimed in claim 8.

* * * * *